Aug. 2, 1966 W. E. PROCTOR 3,263,866
INSTANT COFFEE DISPENSING DEVICE
Filed Sept. 14, 1964 2 Sheets-Sheet 1

INVENTOR.
WALTER E. PROCTOR
BY
ATTORNEY

Aug. 2, 1966 — W. E. PROCTOR — 3,263,866
INSTANT COFFEE DISPENSING DEVICE
Filed Sept. 14, 1964 — 2 Sheets-Sheet 2

INVENTOR.
WALTER E. PROCTOR
BY
ATTORNEY

United States Patent Office 3,263,866
Patented August 2, 1966

3,263,866
INSTANT COFFEE DISPENSING DEVICE
Walter E. Proctor, 2656 County Line Road SW.,
Atlanta 11, Ga.
Filed Sept. 14, 1964, Ser. No. 396,071
5 Claims. (Cl. 222—181)

This invention relates to dispensers, and more specifically, to a new and improved dispenser for so-called instant or powdered coffee.

Heretofore it has been customary to either measure coffee thus dispensed by a sort of hit or miss method, as by simply pouring what appears to be a satisfactory amount into a cup from the jar or other container in which it is merchandised, which method has been found substantially unsatisfactory; or by dipping a teaspoon into the powdered substance and transferring a quantity to the cup. This latter method is not too satisfactory as an exact measurement is not thereby secured, the tendency being to heap the spoon during transfers when the jar is full, and possible to skimp in the latter stages as it becomes empty. Further, time is required for this operation, some spilling often results, and all in all the procedure is not scientifically satisfactory.

An object of the instant invention is to provide an instant coffee dispenser that automatically measures and dispenses an exact amount of coffee on each operation.

Another object is to provide such a device in which the amount of coffee to be dispensed may be quickly and easily regulated as desired.

Another object is to provide agitating means in such a device for the purpose of preventing the powdered substance from becoming caked and thereby upsetting the accurate measurement desired.

Another object is to provide a simple and efficient holder for such a device.

A still further object is to provide simplicity and a minimum of moving parts in a coffee dispenser.

Another object is to provide easy and economical maintenance in such an instrumentality.

Another object is to provide fool-proof means for maintaining the agitator operative so long as the dispensing operation is being actuated.

Another object is to provide self-cleaning or scraping means as between the measuring pocket and the dispensing hole, thereby further insuring accuracy of measurement on each dispensing cycle.

These and other objects made apparent during the further progress of this specification are accomplished by means of the instant invention, a full and complete understanding of which is facilitated by reference to the drawings herein, in which.

Figure 1:
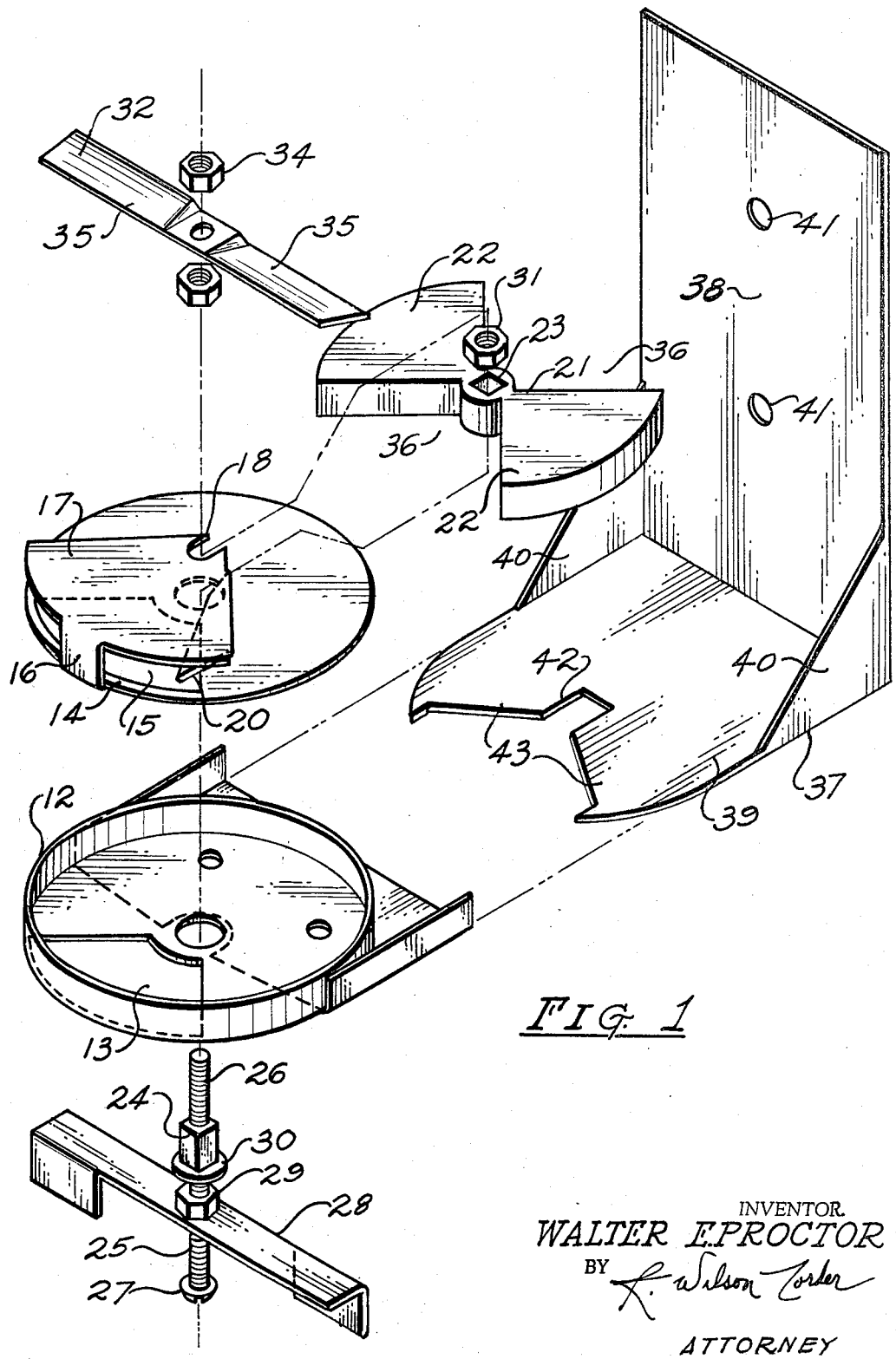
FIG. 1 is an exploded view in perspective of subject device and its preferred holder, some elements being offset from their regular assembled position in order to better illustrate their true structure.
Figure 2:
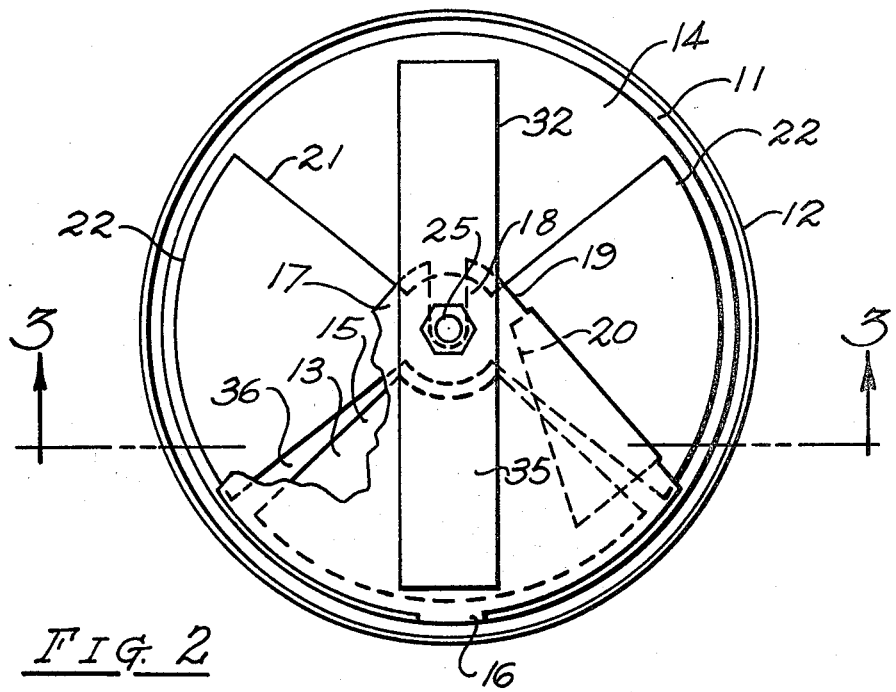
FIG. 2 is a top view of the assembled dispenser.
Figure 3:
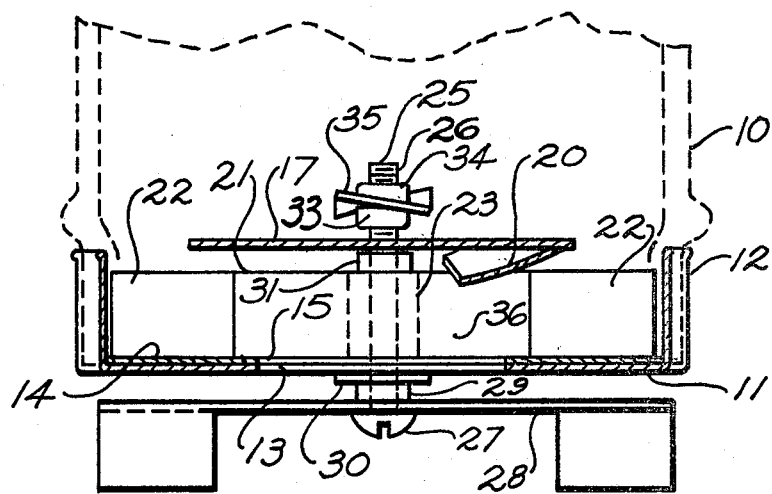
FIG. 3 is a vertical sectional view taken substantially along the line 3—3 of FIG. 2, looking in the direction of the arrows.

Referring now to the drawings, in which identical numerals indicate corresponding elements or parts throughout the various figures, 10 suggests a glass jar or other suitable container provided with the usual screw threads at the top thereof, conventional commercial packages of instant coffee in the larger size being suitable for this purpose. A new cap is now provided for the container, this consisting of a screw cap 11 having sides 12, and being provided with a carefully determined suitable opening 13, within which cap is securely anchored a sealing member or element 14 having an opening 15 similar to 13 and registering with that aperture.

Preferably formed integral with 14 and spacedly mounted therefrom as by leg 16 is a pie-shaped roof-like element 17 having a slot 18 formed in the apex thereof. Element 17 is somewhat larger than openings 15 and 13, and securely mounted to the underside of its leading edge 19 is a downwardly extending sweeper or cleaning element 20, the function and operation of which will be made clear during the further progress of this specification.

Operating snugly in the area between 14–17 is a control or measuring plate 21, having wings 22 and an angular central portion 23 (preferred), for receiving the shank 24 of an operating bolt 25, the upper and lower sections 26 of which may be threaded. Bolt 25 with its head 27 is firmly secured to operating lever 28 as by being passed through an aperture therein at its bottom, and is spaced from cap 11 as by nut 29 and washer 30. A similar nut 31 may be placed upon bolt 25 beneath 17 and bearing against plate 21 to provide a snug fitting at this point.

Finally, a coffee agitator semi-impelling element 32 may be mounted on rod 25 above 17 by means of upper and lower nuts 33 and 34, said element having slightly tilted wing or blade members 35 which serve to keep the coffee above 17 relatively free and loose so that it may enter pocket 36 of measuring and control plate 21 to the fullest extent, and even encouraged to do so by the contour of said blades, which rotate with the dispensing assembly, as will be described more in detail hereafter.

A suitable holding rack 37 may be provided for the instant dispenser, such including an L-shaped member having a back 38 and a bottom 39 with side reinforcing and holding sections 40, and apertures 41 for fastening the rack to a wall or the like through conventional screws. The bottom 39 may be provided with a slot 42 for receiving bolt 25 above operating lever 28, thereby securing the dispenser in desired position. Wings 43 of 39 may be formed as desired.

In operation, the dispenser works as follows:

Jar 10 is filled with instant coffee, or other substance desired to be handled, it being noted that in the former case the coffee should be relieved of the compression or compactness usually associated with it as it is found in conventional containers in the market place. Lid 11 with its several related elements firmly in place as indicated, is now screwed upon the jar, such inverted and placed in holder 37, upon which the device is ready for use.

A coffee cup or other receptacle is placed beneath 13–15, and lever 28 rotated clockwise, with the result that control plate 21 is caused to travel over said openings, carrying with it with one wing 22, a stated and pre-determined amount of instant coffee previously deposited to pocket 36. This quantity usually approximates slightly more than one (1) teaspoon full, but may be varied in keeping with the desires and tastes of the individual user, as by adding a nut similar to 31, or a washer above such, which increases the amount dispensed by increasing the spacing at that point; or pocket 36 itself may be even enlarged, in keeping with the exigencies of a given situation.

Simultaneous with the foregoing operation, sweeping element 20 serves to brush coffee from the top of measuring plate 21, keeping the surface clean at this point, and heelping to insure remarkably accurate measurements at all times.

Lever 28 and its associated elements are then returned to original position preparatory to another measuring and dispensing operation, or a spring (not shown) attached at one end to the lid and to the lever control plate on the other may be employed to automatically perform this function upon release of 28. In some constructions, a ratchet-like arrangement operating in conjunction with the lever may be employed to effect a continuous clockwise motion of 21; or a push-button-linkage may be employed to actuate dispensing, none of these constructions being shown or specifically claimed herein since they are within the purview and concept of the basic invention herein.

It will be noted that due to the nature of instant coffee, it is highly desirable that such be kept tightly sealed and away from the atmosphere at all times, and to this end all fittings herein including cap 11–12, seal 14, element 21 and of course brush 20 are fabricated with minimum tolerances in mind.

From the foregoing it will be apparent that there has been shown, described and taught herein a new and improved dispenser for use with instant coffee and the like, which has the advantages earlier attributed to it, and additional meritorious features which become apparent during the employment and use thereof. While said device in one of its forms has been delineated in some detail, no limitation is intended or implied thereby, but on the contrary, the appended claims are to be accorded a construction and scope fairly in keeping with the contribution to the art.

I claim:

1. In a device of the character described, an air-tight receptacle, a cap therefor, a discharge aperture in said cap, a sealing element securely disposed in said cap, said sealing element having a discharge opening registering with the aperture of the cap and a pie-shaped roof element spacedly mounted above said discharge opening; a measuring or control element rotatably mounted between said seal and the roof thereof, an operating lever spacedly mounted with relationship to said cap, bolt means passed through said lever and said cap, said bolt having an angular shank engaging said measuring element, said measuring element being spaced from the roof of said seal which the bolt also engages, and a coffee agitating blade spacedly mounted above said roof element, whereby when the lever is actuated, instant coffee is dispensed through the openings in the cap and the seal by rotation of the measuring plate, and at the same time, coffee in the receptacle is agitated and kept loose preparatory to dispensing by the rotation of said blade.

2. The device of claim 1 in combination with a holder comprising an L-shaped element having a back, bottom and abbreviated sides, and a slot formed in its bottom to receive said bolt means and thereby stabilize the dispenser in operative position.

3. In a device of the character described, in combination, a receptacle, a tightly fitting cap therefor, a discharge aperture in said cap, a sealing element snugly disposed in the cap said sealing element having a discharge opening registering with thee opening of the cap, a roof-like structure mounted above said seal in spaced relationship thereto, a measuring device mounted between said seal and roof, an operating lever engaging said measuring element through a threaded bolt passed through said lever, cap and seal, and means for spacedly mounting the lever from the cap and the measuring element from the roof of the seal, said latter means being vertically adjustable for varying the clearance between the measuring element and said roof.

4. The device of claim 3 which includes means for agitating coffee in the receptacle preparatory to the dispensing thereof.

5. The device of claim 4 which include a downwardly depending sweeper element for engaging the top of the measuring plate adjacent the discharge apertures, said sweeper being fixedly mounted to the roof above said plate.

References Cited by the Examiner

UNITED STATES PATENTS

| 1,639,370 | 8/1927 | Flegel | 222—370 X |
| 2,446,582 | 8/1948 | Gopner | 222—362 X |

ROBERT B. REEVES, *Primary Examiner.*

CHARLES R. CARTER, RAPHAEL M. LUPO,
*Examiners.*